United States Patent
Da Silva

(10) Patent No.: US 11,412,425 B2
(45) Date of Patent: Aug. 9, 2022

(54) RADIO NETWORK NODES, AND METHODS PERFORMED THEREIN FOR HANDLING COMMUNICATION IN A WIRELESS COMMUNICATION NETWORK

(71) Applicant: Telefonaktiebolaget LM Ericsson (publ), Stockholm (SE)

(72) Inventor: Icaro L. J. Da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 343 days.

(21) Appl. No.: 16/479,636

(22) PCT Filed: Mar. 16, 2018

(86) PCT No.: PCT/SE2018/050258
§ 371 (c)(1),
(2) Date: Jul. 22, 2019

(87) PCT Pub. No.: WO2018/174782
PCT Pub. Date: Sep. 27, 2018

(65) Prior Publication Data
US 2021/0337442 A1    Oct. 28, 2021

Related U.S. Application Data

(60) Provisional application No. 62/476,114, filed on Mar. 24, 2017.

(51) Int. Cl.
*H04W 4/00*          (2018.01)
*H04W 36/00*         (2009.01)
(Continued)

(52) U.S. Cl.
CPC ...... *H04W 36/0072* (2013.01); *H04B 7/0617* (2013.01); *H04W 36/08* (2013.01); *H04W 36/18* (2013.01)

(58) Field of Classification Search
None
See application file for complete search history.

(56) References Cited

U.S. PATENT DOCUMENTS

2013/0083774 A1    4/2013  Son et al.
2016/0309376 A1   10/2016  Liu et al.
(Continued)

FOREIGN PATENT DOCUMENTS

JP    2017028450 A    2/2017
JP    2019532570 A   11/2019
(Continued)

OTHER PUBLICATIONS

International Search Report and Written Opinion of the International Searching Authority, PCT/SE2018/050258, dated Jun. 29, 2018, 8 pages.

(Continued)

*Primary Examiner* — Suhail Khan
(74) *Attorney, Agent, or Firm* — Sage Patent Group

(57) ABSTRACT

Embodiments herein relate e.g. to a method performed by a first radio network node for handling communication of a wireless device in a wireless communication network, wherein the first radio network node serves the wireless device and the wireless communication network further comprises a second radio network node. The first radio network node determines that the wireless device is a device using a beam configuration at the first radio network node. The first radio network node when determined that the wireless device is using the beam configuration transmits a message, to the second radio network node, with an indication requesting that the wireless device gets access to the second radio network node, and also requests usage of a beam configuration at the second radio network node.

24 Claims, 14 Drawing Sheets

(51) Int. Cl.
*H04B 7/06* (2006.01)
*H04W 36/08* (2009.01)
*H04W 36/18* (2009.01)

(56) References Cited

U.S. PATENT DOCUMENTS

| | | | | |
|---|---|---|---|---|
| 2017/0251460 | A1* | 8/2017 | Agiwal | H04B 7/0617 |
| 2018/0139665 | A1* | 5/2018 | Park | H04W 36/0005 |
| 2019/0104549 | A1* | 4/2019 | Deng | H04W 52/365 |
| 2019/0335367 | A1* | 10/2019 | Yue | H04W 36/00 |
| 2020/0053607 | A1* | 2/2020 | Ingale | H04L 5/005 |

FOREIGN PATENT DOCUMENTS

| | | |
|---|---|---|
| WO | 2015100533 A1 | 7/2015 |
| WO | WO 2016/198123 A1 | 12/2016 |
| WO | WO 2017/012472 A | 1/2017 |
| WO | WO 2018/053093 A | 3/2018 |

OTHER PUBLICATIONS

OPPO, "Discussion on Beams Result Report", 3GPP TSG-RAN2#97, Athens, Greece, Feb. 13-17, 2017, R2-1700964, 4 Pages.
3GPP TS 36.331 V13.0.0 (Dec. 2015), 3rd Generation Partnership Project; Technical Specification Group Radio Access Network; Evolved Universal Terrestrial Radio Access (E-UTRA); Radio Resource Control (RRC); Protocol specification (Release 13), 507 Pages.
European Search Report for European application No. EP 18771524 dated Jan. 27, 2020, 5 pages.
CMCC, "Beam Related Measurement Report an Inter-cell HO in NR", 3GPP TSG-RAN WG2 Meeting #97, Athens, Greece, Feb. 13-17, 2017, XP051212459, R2-1701921 (Revision of R2-1700532), 7 Pages.
NTT DOCOM, Inc., "Discussion on mobility procedure for NR", 3GPP TSG RAN WG1 Meeting #88 Athens, Greece, Feb. 13-17, 2017, XP051209978, R1-1702833, 6 Pages.
Notice of Reasons For Rejection with English translation for Japanese Patent Application No. 2019-551965 dated Dec. 1, 2020, 13 pages.
Ericsson, "Inter-cell Handover in NR." 3GPP TSG RAN WG2 #96 R2-168730, Nov. 5, 2016, www.3gpp.org/ftp/tsg_ran/WG2_RL2/TSGR2_96/Docs/R2-168730.zip, 8 pages.
Nokia, Alcatel-Lucent Shanghai Bell, "On RRM Measurement Reporting in NR." 3GPP TSG RAN WG2 #97 R2-1701573, Feb. 3, 2017, www.3gpp.org/ftp/tsg_ran/WG2_RL2/TSGR2_97/Docs/R2-1701573.zip, 4 pages.
Office Action for Chinese Patent Application No. 201880015435.X dated Jan. 5, 2021.

* cited by examiner

CSI-RS-Config information elements

```
-- ASN1START

CSI-RS-Config-r10 ::=        SEQUENCE {
    csi-RS-r10                   CHOICE {
        release                      NULL,
        setup                        SEQUENCE {
            antennaPortsCount-r10        ENUMERATED {an1, an2, an4, an8},
            resourceConfig-r10           INTEGER (0..31),
            subframeConfig-r10           INTEGER (0..154),
            p-C-r10                      INTEGER (-8..15)
        }
    }                                                            OPTIONAL,    -- Need ON
    zeroTxPowerCSI-RS-r10        ZeroTxPowerCSI-RS-Conf-r12       OPTIONAL     -- Need ON
}

CSI-RS-Config-v1250 ::=      SEQUENCE {
    zeroTxPowerCSI-RS2-r12       ZeroTxPowerCSI-RS-Conf-r12       OPTIONAL,    -- Need ON
    ds-ZeroTxPowerCSI-RS-r12     CHOICE {
        release                      NULL,
        setup                        SEQUENCE {
            zeroTxPowerCSI-RS-List-r12   SEQUENCE (SIZE (1..maxDS-ZTP-CSI-RS-r12)) OF ZeroTxPowerCSI-RS-r12
        }
    }                                                            OPTIONAL     -- Need ON
}

CSI-RS-Config-v1310 ::=      SEQUENCE {
    eMIMO-Type-r13               CSI-RS-ConfigEMIMO-r13           OPTIONAL     -- Need ON
}

ZeroTxPowerCSI-RS-Conf-r12 ::= CHOICE {
    release                      NULL,
    setup                        ZeroTxPowerCSI-RS-r12
}

ZeroTxPowerCSI-RS-r12 ::=    SEQUENCE {
    zeroTxPowerResourceConfigList-r12   BIT STRING (SIZE (16)),
    zeroTxPowerSubframeConfig-r12       INTEGER (0..154)
}

-- ASN1STOP
```

FIG. 6

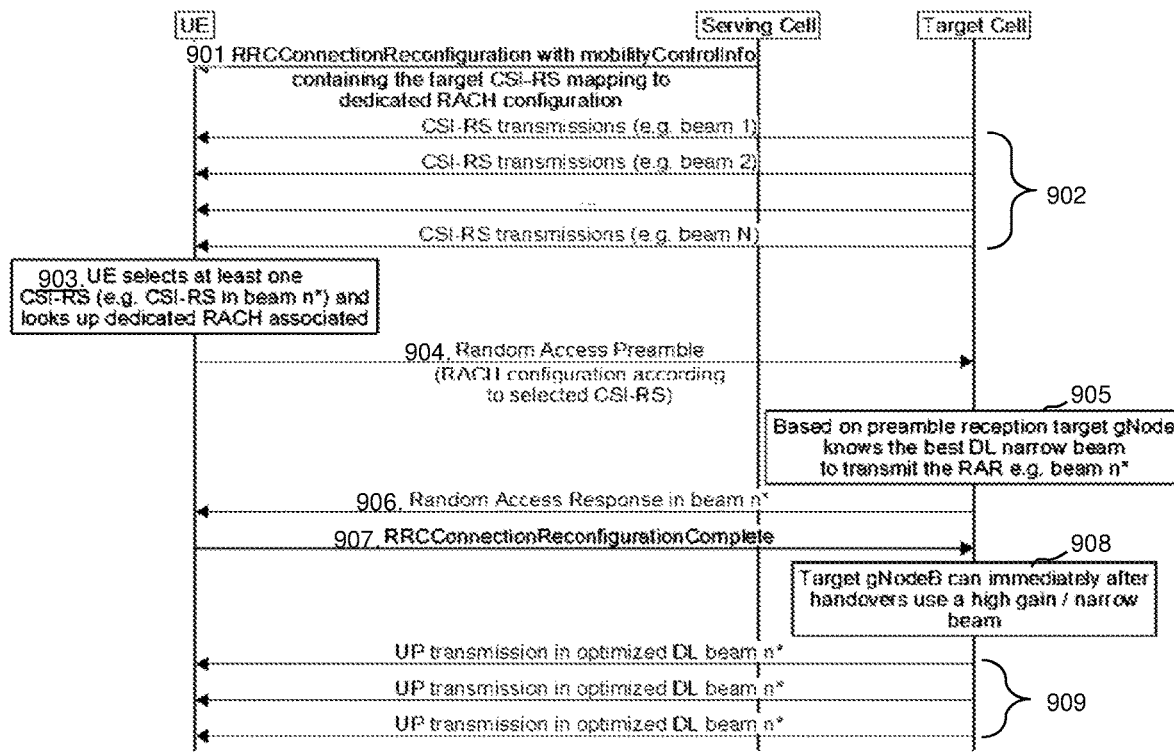
Fig. 9a (same radio network node)

RADIO NETWORK NODES, AND METHODS PERFORMED THEREIN FOR HANDLING COMMUNICATION IN A WIRELESS COMMUNICATION NETWORK

This application is a 35 U.S.C. § 371 national stage application of PCT International Application No. PCT/SE2018/050258 filed on Mar. 16, 2018, which in turns claims domestic priority to U.S. Provisional Patent Application No. 62/476,114, filed on Mar. 24, 2017, the disclosures and content of which are incorporated by reference herein in their entirety.

TECHNICAL FIELD

Embodiments herein relate to radio network nodes and methods performed therein regarding wireless communication. Furthermore, a computer program and a computer-readable storage medium are also provided herein. In particular, embodiments herein relate to handling communication, e.g. handling or enabling handover, of a wireless device in a wireless communication network.

BACKGROUND

In a typical wireless communication network, wireless devices, also known as wireless communication devices, mobile stations, stations (STA) and/or user equipments (UE), communicate via a Radio access Network (RAN) to one or more core networks (CN). The RAN covers a geographical area which is divided into service areas or cell areas, with each service area or cell area being served by radio network node such as an access node e.g. a Wi-Fi access point or a radio base station (RBS), which in some networks may also be called, for example, a "NodeB" or "eNodeB". The service area or cell area is a geographical area where radio coverage is provided by the radio network node. The radio network node operates on radio frequencies to communicate over an air interface with the wireless devices within range of the radio network node. The radio network node communicates over a downlink (DL) to the wireless device and the wireless device communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and this work continues in the coming 3GPP releases, such as 4G and 5G networks such as New Radio (NR). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies, such as new radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

Scheduled reference signals, called channel-state information reference signals (CSI-RS), are transmitted when needed for a particular connection. Channel-state information (CSI) comprises channel quality indicator (CQI), precoding matrix indicator (PMI), and rank indicator (RI). The CQI is reported by wireless device to the radio network node. The wireless device indicates modulation scheme and coding scheme to the radio network node. To predict the downlink channel condition, CQI feedback by the wireless device may be used as an input. CQI reporting can be based on PMI and RI. PMI is indicated by the wireless device to the radio network node, which precoding matrix may be used for downlink transmission which is determined by RI. The wireless device further indicates the RI to the radio network node, i.e. the number of layers that should be used for downlink transmission to the wireless device. The decision when and how to transmit the CSI-RS is made by the radio network node and the decision is signalled to the involved wireless devices using a so-called measurement grant. When the wireless device receives a measurement grant it measures on a corresponding CSI-RS. The radio network node may choose to transmit CSI-RSs to a wireless device only using beam(s) that are known to be strong for that wireless device, to allow the wireless device to report more detailed information about those beams. Alternatively, the radio network node may choose to transmit CSI-RSs also using beam(s) that are not known to be strong for that wireless device, for instance to enable fast detection of new beam(s) in case the wireless device is moving.

The radio network nodes of a NR network transmit other reference signals as well. For instance, the radio network nodes may transmit so-called demodulation reference signals (DMRS) when transmitting control information or data to a wireless device. Such transmissions are typically made using beam(s) that are known to be strong for that wireless device.

In LTE, the main goal of CSI-RSs is to obtain channel state feedback for up to eight transmit antenna ports to assist the radio network node in its precoding operations. Release 10 supports transmission of CSI-RS for 1, 2, 4 and 8 transmit antenna ports. CSI-RSs also enable the wireless device to estimate the CSI for multiple cells rather than just its serving cell, to support future multi-cell cooperative transmission schemes. Notice that the purpose of CSI-RS measurements in LTE is not to support mobility across cells.

The CSI-RS resource allocation for a given subframe is shown in FIG. 1. Code Division Multiplexing (CDM) codes of length two are used, so that CSI-RSs on two antenna ports share two resource elements (RE) on a given subcarrier. The resource elements used in the case of two CSI-RS antenna ports are a subset of those used for four and eight antenna ports; this helps to simplify the implementation. The total number of supported antenna ports may be forty, which can be used to give a frequency-reuse factor of five between cells with eight antenna ports per cell, or a factor of twenty in the case of two antenna ports.

The CSI-RS configuration is wireless device-specific i.e. provided via dedicated Radio Resource Control (RRC) signalling, see FIG. 2. When configured, CSI-RSs are present only in some subframes following a given duty cycle and subframe offset. The duty cycle and offset of the subframes containing CSI-RSs and the CSI-RS pattern used in those subframes are provided to a Release 10 wireless device through RRC signalling. The duty cycle and subframe offset are jointly coded, while the CSI-RS pattern is configured independently of these two parameters.

In summary, the CSI-RS configuration comprises the following (at least until Rel-10):

The number of CSI-RS: e.g. 1, 2, 4 or 8;
  The CSI-RS periodicity: e.g. 5 ms, 10 ms, 20 ms, 40 ms or 80 ms;
  The CSI-RS subframe offset within the CSI-RS period;
  The exact CSR-RS configuration within a resource-block pair—that is exactly what resource elements from the 40 possible REs are used for the up to eight CSI-RS in a resource-block pair.

In the context of cooperative MIMO, it may be possible to improve the performance of channel estimation, and especially interference estimation, by coordinating CSI-RS transmissions across multiple service areas. In Release 10 it is therefore possible to 'mute' a set of REs in data transmissions from a service area. The locations of these REs, known as a 'muting pattern', may be chosen to avoid colliding with CSI-RS transmissions from other service areas and hence improve the inter-cell measurement quality, i.e. measurements of different cells. Notice that in the multi-cell case, there can be some level of coordination so that CSI-RS resource allocation tries to avoid the interference across Transmission and Reception Points (TRP) and/or service areas, as shown in the FIG. 3 where CSI-RS configuration 0 differs from CSI-RS configuration 1 that also differs from CSI-RS configuration 2. Another important aspect relates to how the wireless device receiver handle the CSI-RS. In LTE, time and frequency (T/F) synchronization is obtained from primary synchronization signal (PSS), secondary synchronization signal (SSS), and/or cell specific reference signal (CRS), and a fast Fourier transform (FFT) is applied to relevant CSI-RS symbols and removes the embedded own-cell identity (ID) or RRC configured virtual cell ID, which are 504 possibilities.

The work on Rel-13 full dimension (FD)-MIMO specification in LTE primary includes the support for beamforming in LTE. The wireless device can be configured with a set of CSI-RS processes that may be associated at the network side to different Downlink (DL) beams, which may be different for the different subframes. With beamformed CSI-RS, the wireless device should measure CSI on CSI-RS resources that are beamformed towards different directions, see FIG. 4.

Rel-13 FD-MIMO specification in LTE supports an enhanced CSI-RS reporting called Class B for beamformed CSI-RS. Therein, an LTE RRC_CONNECTED wireless device can be configured with K beams, where e.g. 8>K>1, and where it may be 1, 2, 4 or 8 port number for each beam. For feedback purposes such as PMI, RI and CQI there is a CSI-RS resource indicator (CRI) per CSI-RS. The wireless device reports CRI to indicate the preferred beam where the CRI is wideband, RI, CQI, and/or PMI is based on legacy codebook, i.e. Rel-12, and CRI reporting period is an integer multiple of the RI. For Rel-14 enhancements in Full Dimension (eFD)-MIMO, the following is being considered as potential enhancements such as the extension of CSI-RS antenna port number up to 32 i.e. {20, 24, 28, 32} CSI-RS ports and the introduction of aperiodic CSI-RS, see FIG. 5.

According to the TS 36.331 v. 13.0.0 the CSI-RS configuration (encoded in the CSI-RS-Config IE) can either be transmitted in the RRCConnectionSetup, RRCConnectionResume or the RRC Connection Reconfiguration, with or without mobility Control Information (i.e. in the handover command). See FIG. 6 wherein the CSI-RS configuration (underlined) is transmitted in the RRCConnectionSetup.

CSI-RS may be the primary Reference Signal (RS) for beam management. Compared to the beamformed CSI-RS in LTE, perhaps the main additional use case would be the analog beam sweep, possibly also used for fine T/F tracking. Hence, more flexibility for the NR CSI-RS in NR is also envisioned such as:

Possibly transmitted within 1, 2 or 4 symbols;
  Configurable bandwidth, i.e. not always full system as in LTE;
  Orthogonal Frequency Division Multiplexing (OFDM) symbol may carry CSI-RS only;
  Aperiodic, semi-persistent and periodic transmissions;
  Note: Most of the usage of CSI-RS in LTE and so far, mentioned in NR are related to measurement to support beam management. In addition to that, CSI-RS may be used for radio resource management (RRM) measurements to support inter-cell mobility i.e. movement between different cells, although details have not been defined.

In the following, the mobility in LTE and in particular the handover preparation between radio network nodes, denoted as eNodeBs (eNB), is described.

In LTE, the handover of a wireless device in RRC_CONNECTED state is a wireless device-assisted network-controlled Handover (HO), with HO preparation signalling in E-UTRAN:

Part of the HO command comes from the target eNB and is transparently forwarded to the wireless device by the source eNB see actions 6 and 7;
  To prepare the HO, the source eNB passes all necessary information to the target eNB (e.g. E-Radio Access Bearer (RAB) attributes and RRC context) see action 8;
  Both the source eNB and the wireless device keep some context, e.g. cell—radio network temporary identifier (C-RNTI), to enable the return of the wireless device in case of HO failure;

The wireless device accesses the target cell via random access channel (RACH) following a contention-free procedure using a dedicated RACH preamble or following a contention-based procedure if dedicated RACH preambles are not available; the wireless device uses the dedicated preamble until the handover procedure is finished (successfully or unsuccessfully), see action 9;

If the RACH procedure towards the target cell is not successful within a certain time, the wireless device initiates radio link failure recovery using a suitable cell;

No robust header compression (ROHC) context is transferred at handover;

ROHC context may be kept at handover within the same eNB.

The preparation and execution phase of the HO procedure is performed without CN involvement (EPC in the case of LTE), i.e. preparation messages are directly exchanged between the eNBs. The release of the resources at the source side during the HO completion phase is triggered by the eNB. The FIG. 7 depicts the basic handover scenario where neither mobility management entity (MME) nor serving gateway changes:

Handover preparation in LTE is further described i.e. actions 3, 4, 5 and 6 in FIG. 7. The Handover preparation is initiated by the serving eNodeB that makes decision for a handover, possibly based on MEASUREMENT REPORT and RRM information to hand off the wireless device. Then the follow steps occur:

Action 4: The source eNB issues a HANDOVER REQUEST message to the target eNB passing necessary information to prepare the HO at the target side (wireless device X2 signalling context reference at source eNB, wireless device S1 EPC signalling context reference, target cell ID, KeNB, RRC context including the C-RNTI of the wireless device in the source eNB, access stratum (AS)-configuration, enhanced radio access bearer (E-RAB) context and physical layer ID of the source cell+short medium access control (MAC)-I for possible radio link failure (RLF) recovery). Wireless device X2 signalling and/or wireless device S1 signalling references enable the target eNB to address the source eNB and the EPC. The E-RAB context includes necessary radio network layer (RNL) and transport network layer (TNL) addressing information, and quality of service (QoS) profiles of the E-RABs.

Action 5: Admission control may be performed by the target eNB dependent on the received E-RAB QoS information to increase the likelihood of a successful HO, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

Action 6: The target eNB prepares HO with Layer 1 (L1) and/or Layer 2 (L2) and sends the HANDOVER REQUEST ACKNOWLEDGE (ACK) to the source eNB. The HANDOVER REQUEST ACKNOWLEDGE message includes a transparent container to be sent to the wireless device as an RRC message to perform the handover. The container includes a new C-RNTI, target eNB security algorithm identifiers for the selected security algorithms, and may include a dedicated RACH preamble, and possibly some other parameters i.e. access parameters, System Information Blocks (SIB), etc. The HANDOVER REQUEST ACKNOWLEDGE message may also include RNL and/or TNL information for the forwarding tunnels, if necessary.

NOTE: As soon as the source eNB receives the HANDOVER REQUEST ACKNOWLEDGE, or as soon as the transmission of the handover command is initiated in the downlink, data forwarding may be initiated.

Handover preparation in NR is mainly a RAN3 issue in standardization and work related to intra-NR mobility has not started. On the other hand, in the RAN2 TR, a similar inter-node signalling as in LTE has been assumed as baseline. Hence, it is expected a similar Xn signalling exchanged between radio network nodes, denoted as gNodeBs in NR, i.e. a Handover Request from serving to target, followed by a Handover Request ACK once admission control occurs in the target.

However, despite the similarities with LTE in terms of inter-node signalling, NR should be designed as a system to support a wide range of frequencies, including high frequency bands where beamforming should be used to improve coverage and/or at least to boost the data channel Signal to Interference plus Noise Ratio (SINR) so that the wireless device transmits/receives with very high data rates. However, it may take time for a wireless device to access a beam from target during a handover execution which may reduce or limit performance of the wireless communication network.

SUMMARY

An object of embodiments herein is to provide a mechanism that improves the performance of the wireless communication network when using beamforming in a wireless communication network.

According to an aspect the object is achieved by providing a method performed by a first radio network node for handling communication of a wireless device in a wireless communication network. The first radio network node serves the wireless device and the wireless communication network further comprises a second radio network node. The first radio network node determines that the wireless device is a device using a beam configuration at the first radio network node. The first radio network node transmits a message, when determined that the wireless device is using the beam configuration, to the second radio network node, with an indication. The indication requests that the wireless device gets access to the second radio network node, e.g. a handover, and also requests usage of a beam configuration, e.g. requests a certain Quality of Service (QoS) or a performance of a service or a narrow beam, at the second radio network node.

According to another aspect the object is achieved by providing a method performed by a second radio network node for handling communication of a wireless device in a wireless communication network, wherein the wireless communication network comprises a first radio network node serving the wireless device. The second radio network node receives from the first radio network node, a message with an indication requesting that the wireless device gets access to the second radio network node and also requests usage of a beam configuration at the second radio network node.

Embodiments herein address a coordination issue, focusing on inter-radio network node signaling, i.e. signaling between different radio network nodes, e.g. across an Xn interface e.g. X2 like interface. In some embodiments enhancements are disclosed to what will look like an Xn: Handover Request and the Xn: Handover Request Ack, especially in the case CSI-RS configuration is used for handover execution optimizations in e.g. NR.

According to yet another aspect the object is achieved by providing a first radio network node for handling communication of a wireless device in a wireless communication network. The first radio network node is configured to serve the wireless device, and wherein the wireless communication network further comprises a second radio network node. The first radio network node is configured to determine that the wireless device is a device using a beam configuration at the first radio network node. When determined that the wireless device is using the beam configuration, the first radio network node is configured to transmit a message, to the second radio network node, with an indication requesting that the wireless device gets access to the second radio network node and also requests usage of a beam configuration at the second radio network node.

According to still another aspect the object is achieved by providing a second radio network node for handling communication of a wireless device in a wireless communication network. The wireless communication network comprises a first radio network node serving the wireless device. The second radio network node is configured to receive from the first radio network node, a message with an indication requesting that the wireless device gets access to the second radio network node and also requests usage of a beam configuration at the second radio network node.

It is herein also provided a computer program comprising instructions, which, when executed on at least one processor, causes the at least one processor to carry out the methods herein, as performed by the first radio network node or the second radio network node. Furthermore, it is herein provided a computer-readable storage medium, having stored thereon a computer program comprising instructions which, when executed on at least one processor, cause the at least one processor to carry out the methods herein, as performed by the first radio network node or the second radio network node.

Embodiments herein provide a coordination of beam transmissions wherein a serving radio network node such as the first radio network node informs the target radio network node such as the second radio network node that the wireless device needs a beam configuration or a beam, e.g. a beam providing a certain QoS, upon access to the second radio network node. The second radio network node may then use this message to e.g. trigger transmissions on beams or similar. This will improve the performance of the wireless communication network when using beamforming.

BRIEF DESCRIPTION OF THE DRAWINGS

Embodiments will now be described in more detail in relation to the enclosed drawings, in which:

FIG. 6 shows a CSI-RS-Config information element;

FIG. 9a is a signalling scheme depicting a manner of providing mapping between additional RSs and RACH configuration to a wireless device;

DETAILED DESCRIPTION

Figure 1:
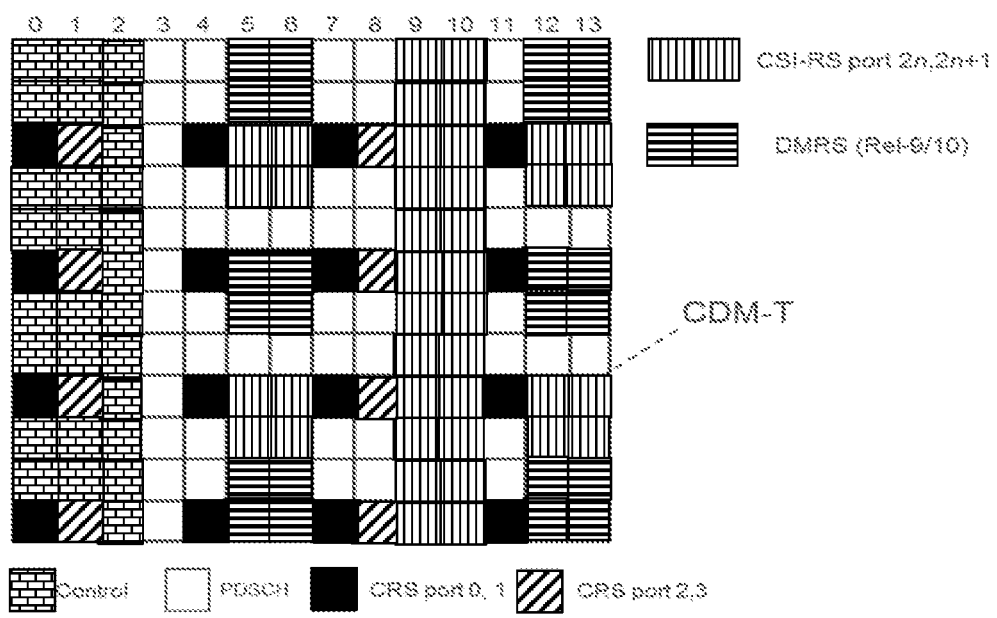
FIG. 1 shows CSI-RS resource allocation for a given subframe and resource block.
Figure 2:
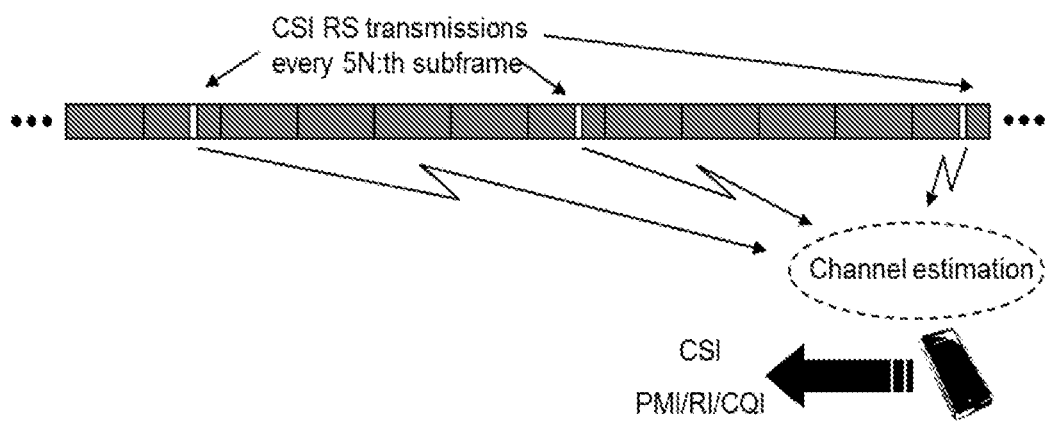
FIG. 2 shows channel estimation of CSI-RS transmissions.
Figure 3:
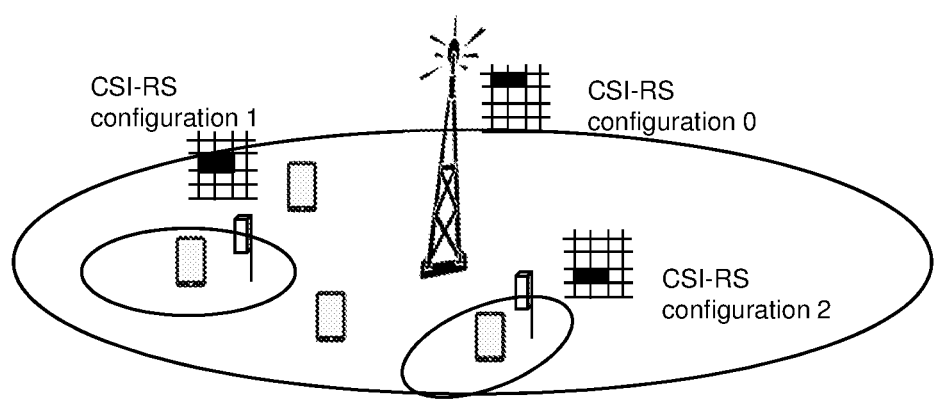
FIG. 3 shows CSI-RS resource allocation across multiple coordinated cells.
Figure 4:
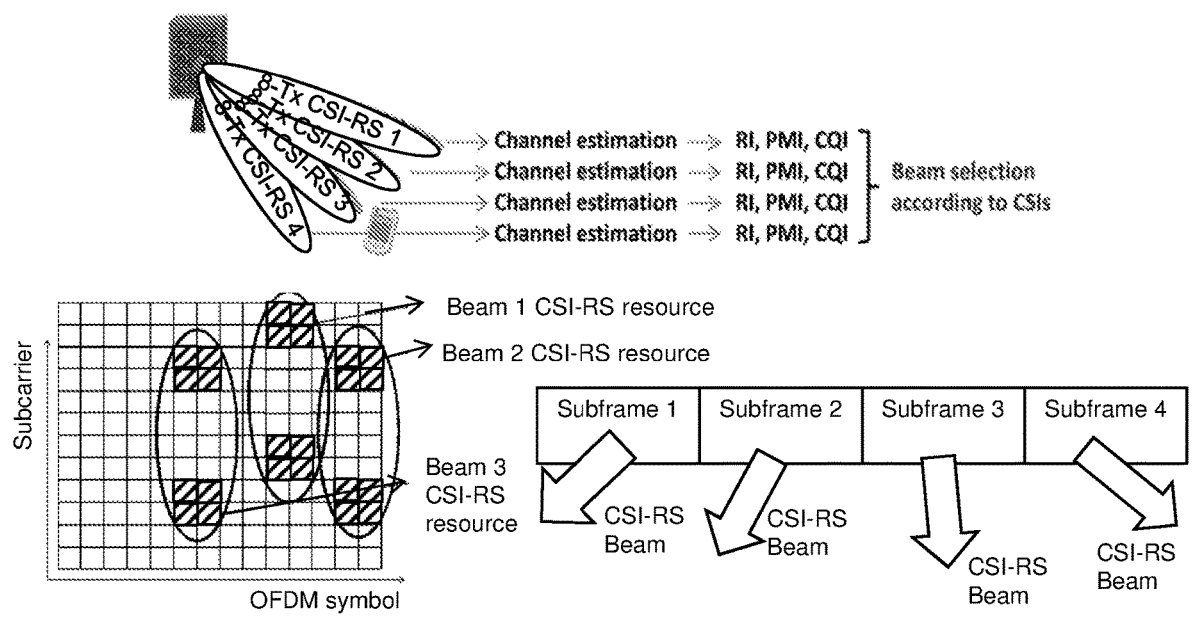
FIG. 4 shows CSI-RS support for beam selection in LTE.
Figure 5:
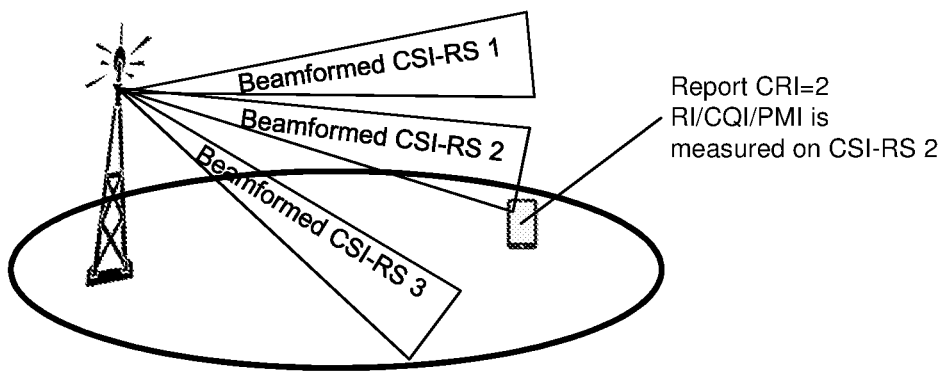
FIG. 5 shows beamformed CSI-RS in LTE.
Figure 7:
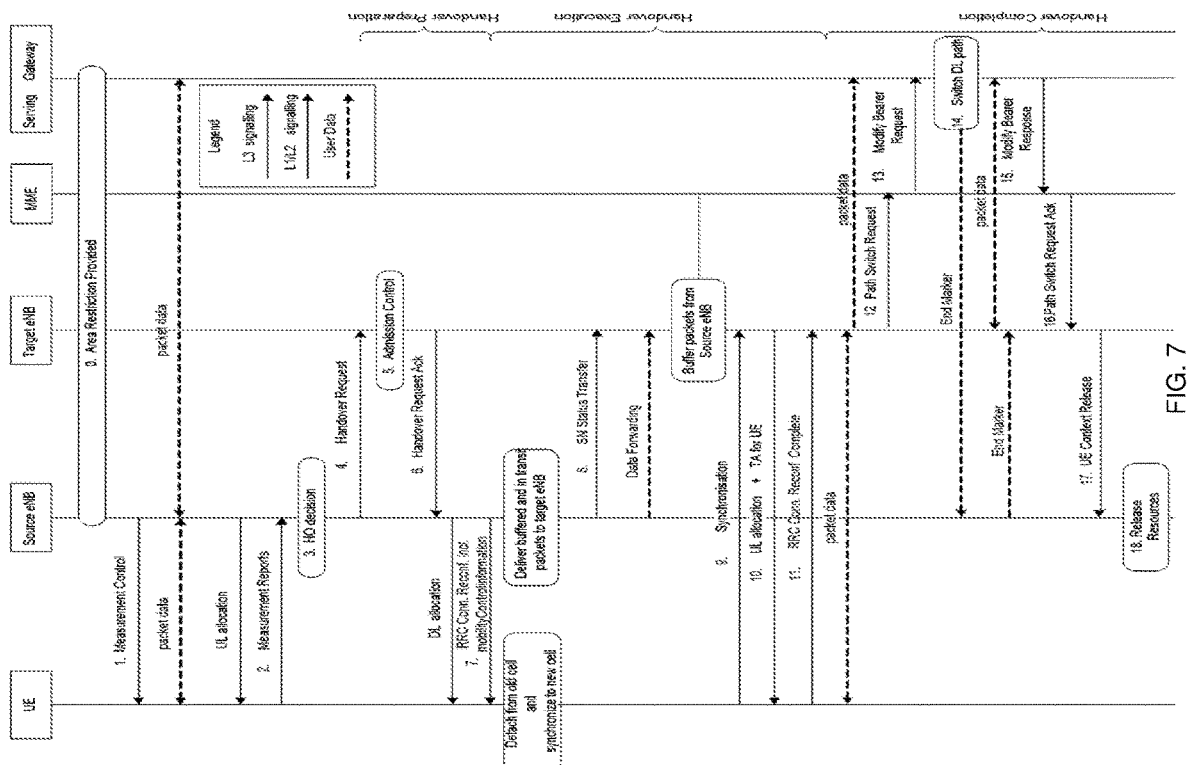
FIG. 7 shows a handover process in LTE.
Figure 8:
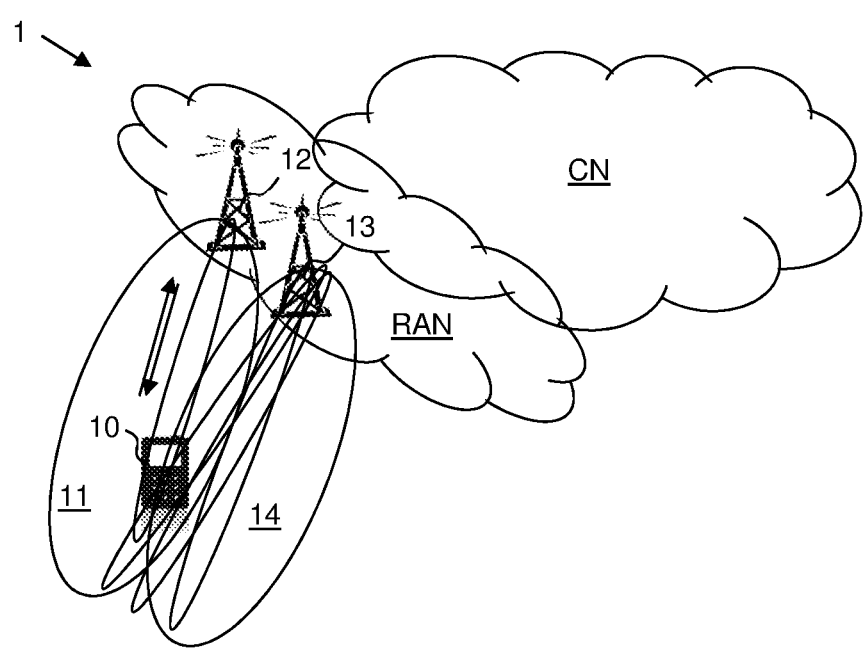
FIG. 8 shows a schematic overview depicting a wireless communication network according to embodiments herein.

Embodiments herein relate to wireless communication networks in general. FIG. 8 is a schematic overview depicting a wireless communication network 1. The wireless communication network 1 comprises one or more RANs and one or more CNs. The wireless communication network 1 may use one or a number of different technologies, such as New Radio (NR), Wi-Fi, LTE, LTE-Advanced, Fifth Generation (5G), Wideband Code-Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context. However, embodiments are also applicable in further development of the existing wireless communication systems such as e.g. WCDMA and LTE.

In the wireless communication network 1, wireless devices e.g. a wireless device such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "wireless device" is a non-limiting term which means any terminal, wireless communication terminal, user equipment, Machine-Type Communication (MTC) device, Device-to-Device (D2D) terminal, or node e.g. smart phone, laptop, mobile phone, sensor, relay, mobile tablets or even a small base station capable of communicating using radio communication with a network node within an area served by the network node.

The wireless communication network 1 comprises a first radio network node 12, also referred to as merely the radio network node, providing radio coverage over a geographical area, a first service area 11 or a first beam or beam group, of a first radio access technology (RAT), such as NR, LTE, Wi-Fi, WiMAX or similar. The first radio network node 12 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), gNodeB, a base transceiver station, a radio remote unit, an Access Point Base Station, a base station router, a transmission arrangement of a radio base station, a stand-alone access point or any other network unit or node capable of communicating with a wireless device within the service area served by the first radio network node 12 depending e.g. on the first radio access technology and terminology used. The first radio network node 12 may be referred to as a serving network node wherein the first service area may be referred to as a source beam, and the serving network node serves and communicates with the wireless device 10 in form of DL transmissions to the wireless device 10 and UL transmissions from the wireless device 10.

A second radio network node 13 may further provide radio coverage over a second service area 14 or a second beam or beam group of a second radio access technology (RAT), such as NR, LTE, Wi-Fi, WiMAX or similar. The first RAT and the second RAT may be the same or different RATs. The second radio network node 13 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), gNodeB, a base transceiver station, a radio remote unit, an Access Point Base Station, a base station router, a transmission arrangement of a radio base station, a stand-alone access point or any other network unit or node capable of communicating with a wireless device within the area served by the second radio network node 13 depending e.g. on the second radio access technology and terminology used. The second radio network node 13 may be referred to as a neighbour network node wherein the second service area 14 may be referred to as a neighbouring beam or target beam.

It should be noted that a service area may be denoted as a cell, a beam, a mobility measurement beam, a beam group or similar to define an area of radio coverage. The radio network nodes transmit RSs over respective service area. Hence, the first and second radio network nodes may transmit CSI-RSs or beam reference signals (BRS), repeatedly, in time, in a large number of different directions using as many Tx-beams as deemed necessary to cover an operational area of the respective radio network node. Hence the first radio network node 12 provides radio coverage over the first service area using a first reference signal, e.g. first CSI-RS, for the first service area 11 or first beam in the wireless communication network 1. The second radio network node 13 provides radio coverage over the second service area 14 using a second reference signal, e.g. second CSI-RS, for the second service area 14 or second beam in the wireless communication network.

For a case where both serving service area and target service area may belong to a same radio network node, a solution has been proposed based on the handover command from serving service area to the wireless device containing CSI-RS configurations transmitted by target service area mapped to RACH resources of target service area to be used by the wireless device during the handover execution, more precisely when the wireless device is synchronizing with the target service area and initiating the random access procedure. During the handover execution the wireless device selects one or a set of CSI-RS (and consequently a DL beam) e.g. the strongest one(s), and, using the RACH resources associated to the selected CSI-RS and initiating a random access. Based on preamble detection, the target cell knows which is the strongest DL beam to transmit the Random Access Response (RAR) and continue the connection, including User Plane (UP) data transmission using high gain Physical Downlink Shared Channel (PDSCH), as shown in FIG. 9*a*.

Action 901. A radio network node providing a serving cell configures or transmits configuration parameters related to mapping of one or more reference signals to RACH configurations. E.g. the radio network node of the serving cell may transmit, to the wireless device, RRCConnectionReconfiguration with mobilityControlInfo containing the target CSI-RS mapping to dedicated RACH configuration.

Action 902. The radio network node of a target cell may then transmit or perform a number (N) of transmissions of the narrow beams e.g. CSI-RS transmissions of different beams.

Action 903. The wireless device may then select at least one CSI-RS (e.g. CSI-RS beam n*) and look up the dedicated RACH configuration according to the mapping.

Action 904. The wireless device may transmit then transmit a Random Access preamble according to the RACH configuration of the selected CSI-RS.

Action 905. The radio network node of the target cell may then initiate a beam transmission based on the received RA preamble. E.g. based on the preamble reception the radio network node knows the best DL narrow beam to transmit the RAR on, e.g.

beam n*.

Action 906. The radio network node of the target cell may thus transmit the RAR in beam n* to the wireless device.

Action 907. The wireless device may then transmit an RRCConnectionReconfiguration complete to the radio network node of the target cell such as a target gNodeB.

Action 908. The radio network node of the target cell may then immediately after handover use a high gain/narrow beam.

Action 909. The radio network node of the target cell may thus perform UP transmissions in optimized DL beam n* to the wireless device.

In the case where cells do not belong to the same radio network node, additional coordination beyond the existing X2 signalling in the Handover Request and Handover Request Ack may be required and current solution in LTE does not support that.

The current handover preparation procedure over X2 in LTE does not enable the mapping between CSI-RS configuration transmitted by the second radio network node 13 and RACH resources (time, frequency and preamble) RS to enable a wireless device to execute a handover and, at the same time, perform beam refinement/beam selection at the target service area.

According to embodiments herein the problem may be solved by a method between two radio access network functions (or logical nodes) such as the first radio network node 12 and a target radio network node such as the second radio network node 13. The first radio network node 12 serving the wireless device 10 provides the second radio network node 13 with information implying that a candidate wireless device such as the wireless device 10 (or a set of wireless devices) to be e.g. handed over requires a usage of a beam configuration such as a high data rate channel with high gain beamforming of PDSCH in the second service area for seamless mobility. This information may be transmitted in the Xn: Handover Request message.

During admission control the second radio network node 13 may accept the wireless device 10 and respond with a beam configuration such as a configuration of high gain beamformed reference signals (RS), such as CSI-RS, that would be valid (i.e. transmission of these should be expected) at least until the time the wireless device 10 performs the handover execution and, a mapping between the RACH at the second radio network node 13 (i.e. time, frequency and preamble sequence) and the different RS e.g. CSI-RS (time, frequency and sequence). Embodiments herein provide a coordination for the combined inter-cell mobility with beam refinement/selection for seamless mobility even in an inter-node case. Inter-cell mobility meaning movement between different cells and inter-node between different radio network nodes.

Even in scenarios where target and serving cells from different radio network nodes, the network can implement the transmission of SS Burst Sets in wide beams and, only when required, allow a wireless device, performing a handover, to quickly access a narrow beam in a target cell, wherein narrow beam is a beam providing a requested QoS or a requested performance of a service. That allows a seamless mobility for high data rate services and, at the same time, does not enforce the network to implement a solution with high overhead (or even high latency, for a fixed overhead. A narrow beam may be defined as an RS that is beamformed in a narrow beam, and a wide beam may be defined an RS that is beamformed in a wide beam. Beam is a reference signal that is beamformed, that is, transmitted in a certain direction.

It should be noted that in a general scenario the term "radio network node" can be substituted with "transmission and reception point". One may make a distinction between the transmission reception points (TRPs), typically based on RSs or different synchronization signals and BRSs transmitted. Several TRPs may be logically connected to the same radio network node but if they are geographically separated, or are pointing in different propagation directions, the TRPs will be subject to the same issues as different radio network nodes. In subsequent sections, the terms "radio network node" and "TRP" can be thought of as interchangeable.

It should further be noted that a wireless communication network may be virtually network sliced into a number of Network/RAN slices, each Network/RAN slice supports one or more type of wireless devices and/or one or more type of services i.e. each network slice supports a different set of functionalities. Network slicing introduces the possibility that the network/RAN slices are used for different services and use cases and these services and use cases may introduce differences in the functionality supported in the different network slices. Each network/RAN slice may comprise one or more network nodes or elements of network nodes providing the services/functionalities for the respective network slice. Each network/RAN slice may comprise a network node such as a RAN node and/or a core network node.

The method actions performed by the first radio network node 12 for handling communication of the wireless device 10 in the wireless communication network 1 according to some embodiments will now be described with reference to a flowchart depicted in FIG. 9b. The actions do not have to be taken in the order stated below, but may be taken in any suitable order. Actions performed in some embodiments are marked with dashed boxes. The first radio network node 12 serves the wireless device 10 and the wireless communication network 1 further comprises the second radio network node 13.

Action 911. The first radio network node 12 may receive a measurement from the wireless device 10, wherein the measurement indicates a signal strength or quality of the second radio network node 13 fulfilling a condition. The condition may be: the measurement fulfills signal strength or quality for a handover; the signal strength or quality is above a threshold etc.

Action 912. The first radio network node 12 determines that the wireless device is a device using a beam configuration at the first radio network node 12. E.g. the first radio network node 12 may determine that the wireless device 10 is using a beam configuration by analyzing Buffer Status Reports (BSR), previous data rate requirement patterns, the QoS profile of the wireless device 10, the currently used bearer, some wireless device policy for high reliability and low latency to access high data rates or a combination of any of these information.

Action 913. The first radio network node 12 further transmits a message when it is determined that the wireless device 10 is using the beam configuration, to the second radio network node 13, with an indication requesting that the wireless device 10 gets access to the second radio network node 13 and also requests usage of a beam configuration at the second radio network node 13. The message may be transmitted when the condition in action 911 is fulfilled. The message may be an X2 message. The indication may request usage of the beam configuration by indicating usage of a high data rate channel with beamforming of a PDSCH at the second radio network node 13 for seamless mobility. The indication may be transmitted in X2 signalling to the second radio network node 13. The indication may request usage of the beam configuration by indicating a requested quality of service or a performance of a service. Thus, the first radio network node 12 may decide, after determining that the wireless device 10 is a device using a beam configuration, to handover the wireless device to the second radio network node 13, e.g. based on the measurements received in action 911. The message may further comprise beam quality indication reported by the wireless device 10 and associated to the second radio network node 13.

Action 914. The first radio network node 12 may further receive a confirmation from the second radio network node 13, which confirmation comprises a configuration indication indicating mapping of reference signals (RS) and random access channel (RACH) configuration, and/or a configuration of RSs transmitted in beams at the second radio network node 13.

Action 915. The mapping of RSs and RACH configuration, and/or RS configuration may be forwarded to the wireless device 12.

The method actions performed by the second radio network node 13 for handling communication of the wireless device 10 in the wireless communication network 1 according to some embodiments will now be described with reference to a flowchart depicted in FIG. 9c. The actions do not have to be taken in the order stated below, but may be taken in any suitable order. Actions performed in some embodiments are marked with dashed boxes. The wireless communication network 1 comprises the first radio network node 12 serving the wireless device 10.

Action 921. The second radio network node 13 receives from the first radio network node 12, the message with the indication requesting that the wireless device 10 gets access to the second radio network node 13 and also requests usage of the beam configuration, such as a narrow beam, at the second radio network node 13. The indication may request usage of the beam configuration by indicating usage of a high data rate channel with beamforming of a PDSCH at the second radio network node 13 for seamless mobility. The indication may be transmitted in X2 signalling from the first radio network node 12. The indication may request usage of the beam configuration such as a narrow beam by indicating a requested quality of service or a requested performance of a service. The message may further comprise beam quality indication reported by the wireless device 10 and associated to the second radio network node 13.

Action 922. The second radio network node 13 may determine whether to admit the wireless device 10.

Action 923. The second radio network node 13 may transmit, when determined to admit the wireless device 10, the confirmation to the first radio network node 12, which confirmation comprises the configuration indication indicating mapping of RS and RACH configuration and/or a configuration of RSs transmitted in beams at the second radio network node 13.

Action 924. The second radio network node 13 may start transmission of one or more RSs of respective beam configuration. Hence, the reception of the message may trigger the initiation of transmissions of the RSs of the beam configurations.

Action 925. The second radio network node 13 may detect an initiated random access procedure from the wireless device 10 using at least part of a RACH configuration, which RACH configuration is mapped to a RS out of the one or more RSs transmitted.

Action 926. The second radio network node 13 may then use the beam configuration associated to the RS to perform data transmissions to or from the wireless device.

The problem previously described is solved by a method between two radio network node functions (or logical nodes) such as a serving gNodeB and a target gNodeB. In embodiments herein the serving gNodeB, i.e. the first radio network node, provides the target gNodeB, i.e. the second radio network node, with information implying that a candidate wireless device (or set of wireless devices) to be handed over require the usage of a high data rate channel with high gain beamforming of Physical Downlink Shared Channel (PDSCH) in the target cell for seamless mobility. That may be transmitted in an Xn: Handover Request message.

During admission control the second radio network node may accept the wireless device and respond with the configuration of high gain beamformed reference signals (RS), such as CSI-RS, that may be valid (i.e. transmission of these should be expected) at least until the time the wireless device performs the handover execution and/or a mapping between the RACH configurations at the second radio network node (i.e. time, frequency and preamble sequence) and the different CSI-RS (time, frequency and sequence).

Once this configuration is transmitted the second radio network node may start the transmission of these beamformed RSs if it is not already transmitting (to serve other neighbour radio network nodes that might have request the same "service") and triggers a timer from which it waits until the preamble to be transmitted.

Once the first radio network node receives this configuration it may configure the wireless device with it for the handover execution.

If a preamble is detected the second radio network node knows the best DL beam to send the RAR, and may continue the control plane signalling and the UP data transmission over a high gain beamformed PDSCH.

There can be further embodiments related to how the RACH and the beamformed RS mapping can be used for groups of wireless devices.

It is herein exemplified a handover preparation case, however, most of the aspects are similar if embodiments are applied to the setup of a secondary cell e.g. in dual connectivity. Further are also a first and second radio network node provided to perform the methods herein.

Even in scenarios where target and serving cells from different radio network nodes, the network can implement the transmission of SS Burst Sets in wide beams and, only when required, allow a wireless device performing a handover to quickly access a narrow beam in a target cell. That allows a seamless mobility for high data rate services and, at the same time, does not enforce the network to implement a solution with high overhead (or even high latency, for a fixed overhead). This will lead to an improved performance of the wireless communication network.

Figure 10:
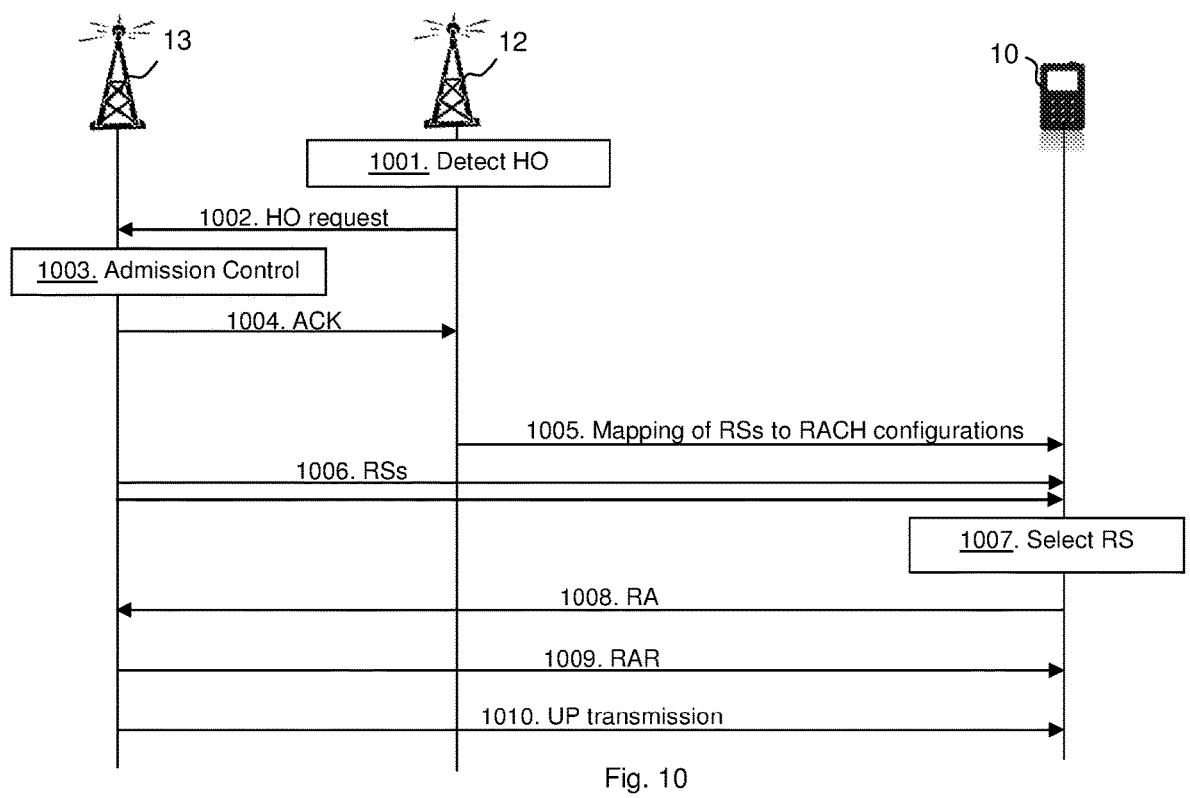
FIG. 10 is a schematic combined flowchart and signalling scheme according to embodiments herein.

FIG. 10 is a schematic combined flowchart and signalling scheme depicting some embodiments herein. According to embodiments disclosed herein the serving first radio network node 12 decides to request a handover for the wireless device 10 (or a set of wireless devices) to a specific candidate target service area associated to the second radio network node 13.

Action 1001. The first radio network node 12 may detect that the wireless device requires seamless mobility in terms of high data rates and consequently the usage of (narrow) beams in the target cell as soon as it moves there. That detection can be done by analyzing Buffer Status Reports (BSR), previous data rate requirement patterns, the QoS profile of the wireless device, the currently used bearer, some wireless device policy for high reliability and low latency to access high data rates or a combination of any of these information.

The serving first radio network node 12 may also have Radio Resource Management (RRM) measurements available (reported by the wireless device 10) associated to the candidate target service area and, in particular, beam-specific measurements associated to the target first radio network node 12. These beam-specific measurements could be distinguished via the timing the beams were transmitted and sent jointly with the cell level Reference Signal Received Power (RSRP) and/or even RSRP values associated to the previously configured CSI-RS resources of the target that could be further mapper to DL beams in a target gNodeB such as the second radio network node 13. These are examples of the actions 911-912 in FIG. 9b.

Action 1002. After that detection the serving first radio network node 12 prepares an Xn: Handover Request that is transmitted to the target second radio network node 13, comprising QoS parameters, being examples of the indication, for the potential incoming wireless devices indicating the presence of bearers requiring data rates that could only be supported with high gain beamforming of the PDSCH, i.e. the wireless device 10 may request a quite fast access to a (narrow) beam in the target cell. That handover request may also contain that beam-specific information associated to the target e.g. CSI-RS RSRP values associated to the DL beams in the target cell. Thus, the message comprises the indication requesting access and usage and may comprise beam quality indication reported by the wireless device 10 and associated to the second radio network node 13.

Figure 9B:
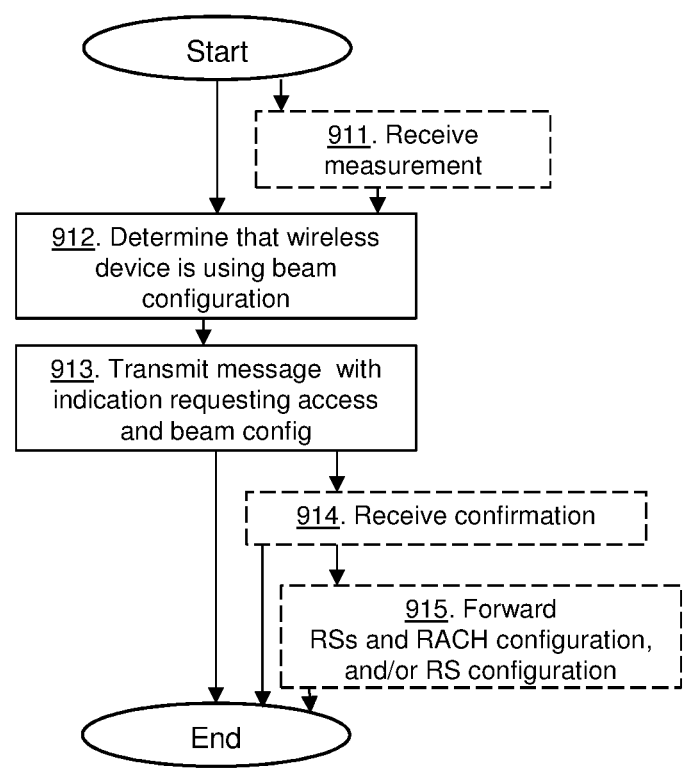
FIG. 9b is a schematic flowchart depicting a method performed by a first radio network node according to embodiments herein.

These are examples of the action 913 in FIG. 9b.

Action 1003. Upon the reception of the Xn: Handover Request the second radio network node 13 performs admission control and may decide to accept the incoming wireless device (s) and prepares an Xn: Handover Request Ack that can contain the configuration of a set of RSs also referred to as additional Reference Signals and the time/frequency resources on which they are transmitted, possibly relative to the sync signals e.g. PSS/SSS/TSS, where these are associated to DL beams transmitted by the target cell. The time domain indication not only informs when the additional RS is coming in time but may also inform for how long it remains, e.g. in terms of number of subframes. The configuration may also contain RS identifiers. In general, the time/frequency/sequence resources should enable the wireless device 10 to distinguish beams transmitted by the second radio network node 13 associated to the target service area. The configuration comprises a mapping between these RSs and the RACH resources, either dedicated or common for the wireless device 10 to access the target service area. The candidate target second radio network node 13 may also reject the bearers and/or flow associated to the required high data rate wireless device 10 for the high gain beamformed PDSCH such as when the second radio network node 13 does not have available resources to transmit CSI-RS for the purpose of handover execution. This is an example of the action 922 in FIG. 9c.

Action 1004. Thus, the second radio network node 13 transmits the mapping of the additional RSs and RACH configurations to the first radio network node 12, in e.g. a HO ACK.

If the target second radio network node 13 has previously provided CSI-RS configuration to the serving first radio network node 12 for measurement purposes, the target second radio network node 13 can provide in the HO ACK an indication that the same CSI-RS configuration could be reuse and then only the mapping between the RSs and the RACH resources are provided in the HO ACK.

If the target second radio network node 13 has previously provided CSI-RS configuration to the serving first radio network node 12 for measurement purposes, the target second radio network node 13 may provide in the HO ACK an indication that a delta configuration is being provided i.e. additional CSI-RS configuration together with the mapping to the RACH resources associated to the previously configured CSI-RS and the additional CSI-RSs.

The target second radio network node 13 can also respond with an indication of a default configuration to be used by the serving first radio network node when indicated such as via an index. That default configuration may also be associated to a validity time and/or be assumed to be valid until further notice from the target second radio network node 13. The validity time can be counted by a certain number of subframes the CSI-RSs are expected to be transmitted. By doing that the serving first radio network node 12 can always use that same CSI-RS configuration for other wireless devices once it has received the configuration, except for the dedicated part of the RACH mapping e.g. dedicated preamble for contention-free access.

The information from the target second radio network node 13 may also contain multiple synchronization references (e.g. virtual target cell IDs) in the case it allows the wireless device to access one of its multiple radio network nodes which might not be completely synchronized with the serving cell.

Figure 9C:
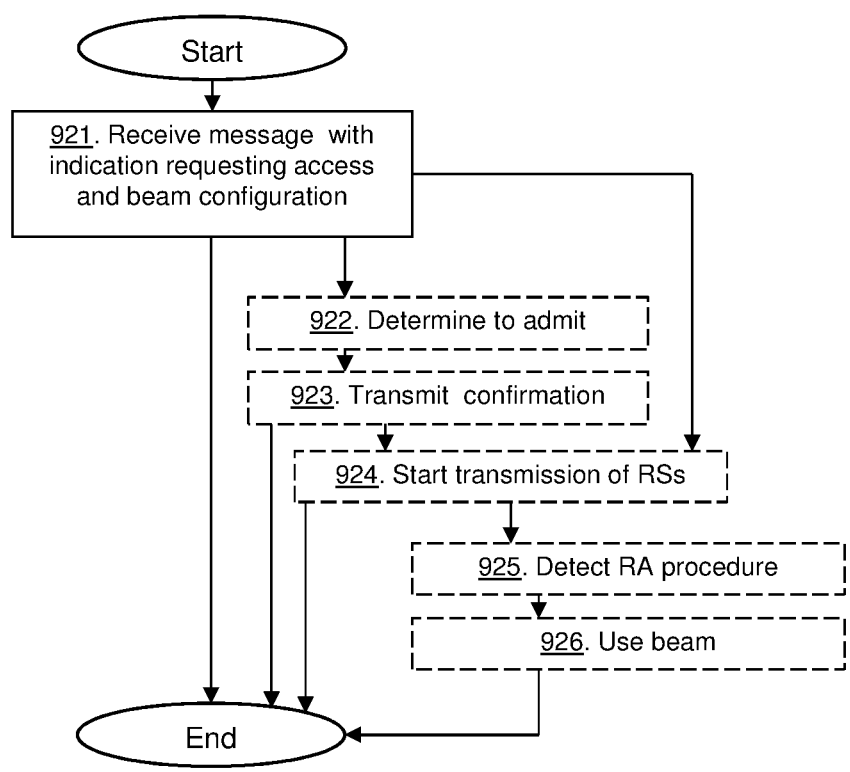
FIG. 9c is a schematic flowchart depicting a method performed by a second radio network node according to embodiments herein.

These are examples of the action 923 in FIG. 9c.

Action 1005. The first radio network node 12 may then transmit the mapping of reference signals to one or more random access channel (RACH) configurations. For example, the first radio network node 12 provides to an RRC_CONNECTED wireless device a mapping between RACH configurations and reference signals (RS) that can be transmitted with high gain beamforming, differently from static signals transmitted in wide beams. Static signals are the ones transmitted in the SS Block, such as NR-PSS/NR-SSS/TSS/DMRS for PBCH, while the additional RS could be a CSI-RS. At the network side, the additional RS in narrow beams while beamform the SS Block in wide beams or vice-versa, use cases for these different configurations will be described later.

The mapping can be provided to the wireless device 10 when the first radio network node 12 decides to handover the wireless device 10 from the first service area to the second service area and/or when the first radio network node 12 wants to establish dual connectivity, carrier aggregation or equivalent. That can be the case when the wireless device 10 is connected to LTE and the second service area is an NR cell candidate or a potential secondary cell for inter-RAT NR-LTE dual connectivity/tight interworking. Hence, the mapping may be provided to the wireless device 10 in an RRCConnectionReconfiguration associated to a target (or candidate to be the SCell) in the same RAT or in a different RAT.

The method may comprise the wireless device 10 receiving a command that trigger the wireless device 10 to access another cell, either as in a handover or in addition to a primary cell (as in the case of a handover), as in the case of the establishment of a secondary cell (for dual connectivity and/or carrier aggregation). In the handover case, for example, that will be an RRCConnectionReconfiguration message with the mobilityControlInfo IE) containing a set of K candidate RACH configurations of the target cell where $1 \leq K \leq N$, where N is the number of DL narrow beams or addition RSs made available by the target cell/service area.

Each of these K RACH configurations is associated with one or a subset of the N additional RSs made available by the target cell/service area at least during the time the wireless device is trying to access the target/secondary cell/service area (i.e. handover execution or secondary cell establishment). There should be no more than one RACH configuration for a single CSI-RS. But multiple CSI-RSs may share the same RACH configuration.

The additional RS may be a CSI-RS used primarily for intra-cell beam management but also used for inter-cell mobility/secondary cell establishment and beam selection simultaneously. Hence, when CSI-RS is mentioned it should be understood as an embodiment, while it could be any other RS used for beam management that is not transmitted in a SS Block. In the particular case of the CSI-RS there may be parameters associated to beamformed CSI-RS such as: its bandwidth; the time domain resources they are being transmitted on such as subframes and Orthogoal Frequency-Division Multiplexing (OFDM) symbol within the subframes; time-domain sync reference to base the subframe offset on; frequency domain resources (since no full bandwidth CSI-RS); sequence and association to virtual cell ID or any other identifier that enables the wireless device 10 to derive the CSI-RS sequence, in the case blind detection is not expected.

RACH configuration in this context refers to information of e.g. the time-frequency-resources for the RACH preamble to be used during random access to the specified cell or a certain preamble or similar. Hence, there may be more common RACH parameters in addition to these ones used to perform narrow beam selection.

The RRC message that triggers the wireless device 10 to access the secondary/target cell/service area may contain configuration of N additional RSs (which can be CSI-RSs) transmitted in beams. In that context N can be larger or equal to one. Notice that these additional RSs are transmitted in or associated with different DL beams. That configuration about the target's/secondary cell's additional RS, may inform the wireless device 10 in which subframes the RSs are transmitted, for how long, which periodicity (in the case they are periodic), for how long they last (e.g. in terms of number of subframes), etc.

Alternatively, if only the RACH mapping and/or an indication flag is provided in the message the wireless device 10 may assume a previously received configuration for additional RS(s) associated to the target/secondary cell. It is also possible that the message contains a delta configuration that changes/update the RS configuration such as adding RSs (which would imply adding the transmission in additional DL beams), removing RS(s), etc.

The message such as the RRC message informing the wireless device 10 of the mapping may also contain an indication about the synchronization assumption of the target cell/secondary cell compared to the serving/primary cell. When receiving the mapping between RACH configurations and the additional RSs the wireless device 10 may then know that the detection prior to measurements may require additional synchronization or not. In the case it requires, the message may also contain the physical cell identifier (PCI) as an implicit way to inform the wireless device 10 that the detection of additional RS may require an additional synchronization step.

These are examples of the action 915 in FIG. 9b.

Action 1006. The second radio network node 13 transmits reference signals of narrow beams. This is an example of Action 924 in FIG. 9c.

Action 1007. The wireless device 10 may select a narrow beam i.e. a selected reference signal, based on measurements on received reference signals. The wireless device 10 may thus perform a beam selection during handover execution or dual connectivity setup. For example, after receiving a RRC message from the serving cell that triggers the access to the target/secondary cell (e.g. RRCConnectionReconfiguration), the wireless device 10 searches for the additional RS associated to the target service area, performs measurements and selects the RS associated to the best quality or strength, for example, based on best Reference Signal Received Power (RSRP), Signal to Interference plus Noise Ratio (SINR), Signal to Noise Ratio (SNR) or some other measure of the signal strength or signal quality. In other words, the wireless device 10 indirectly selects the strongest DL narrow beam transmitting or being associated with the additional RS. Thus, the wireless device 10 receives and measures signal strength or quality (Q) of the RSs e.g. from both the first and the second radio network node. E.g. the wireless device 10 may determine which RS has a highest Q out of the RSs.

Thus, upon receiving the RRC message to access a secondary/target cell or service area, the wireless device may:

3.1) Search for the additional RS associated to the target cell;

3.2) Perform measurements based on the detected additional RS;

3.3) Selects the RS associated to the best quality.

In sub-action 3.1), if the RRC message in action 302 contained an indication that the target cell or secondary cell is synchronized with the serving or primary cell, the wireless device 10 may use its primary cell synchronization source as reference (including its subframe timing) and search for the additional RS after receiving the RRC message (in the handover case that would be during the so-called synchronization phase). That search should be done based on the configuration of the additional RS i.e. in a specific subframe shift associated to the serving cell synchronization source used in connected mode. If the message did not contain that indication the wireless device 10 should use the target/secondary physical cell identifier to synchronize with the target/secondary cell prior to the detection of additional RS or use a previously acquired synchronization with that same cell (in the case the time has not elapsed). As mentioned above, before actually detecting a CSI-RS in the target cell the wireless device 10 may have a rough synchronization with the DL transmissions of the target cell. Hence, the wireless device 10 first has to receive the synchronization signal of the target cell, i.e. the NR-PSS/NR-SSS, which is part of the SS Block (note that it may be enough for the wireless device 10 to receive the NR-PSS/NR-SSS, but may skip the reception of the remainder of the SS Block). The wireless device 10 may receive the NR-PSS/NR-SSS—and thus acquire DL synchronization in the target cell—and detect the CSI-RS transmission(s) in one integrated procedure upon reception of the HO command in the serving cell. Alternatively, the wireless device 10 may previously have received the NR-PSS/NR-SSS of the target cell, e.g. for the purpose of neighbour cell measurements for potential handover considerations, and if not too long time has elapsed since the wireless device's latest reception of the NR-PSS/NR-SSS of the target cell (where the acceptable time may depend e.g. on the assumed or measured movements of the wireless device 10 and/or the assumed drift of the wireless device's internal clock in relation to the timing of the target cell), the wireless device 10 may consider its previously acquired DL synchronization with the target cell as still valid and may directly go for detection of the CSI-RS transmission(s) (without an additional reception of the NR-PSS/NR-SSS) after receiving the HO command.

In sub-action 3.2), after discovering the RS resources, the wireless device 10 may perform measurements according to the previously obtained configuration or based on some pre-defined rule in the standard. These measurements may be so-called one-shot measurements in the time domain, as in the beam management procedures for CQI reporting, or it can be filtered measurements. The filtering may simply be a frequency domain filtering in the configured bandwidth for the additional RS, but it may also include time-domain parameters indicating that the wireless device 10 may measure at least a certain number of consecutive subframes before making a selection. Notice that this configuration may take into account the wireless device beamforming i.e. a certain number of repetition allowing the wireless device 10 to select its optimal beam.

In sub-action 3.3 the wireless device 10 may select the best additional RS, which is equivalent to the selection of the best DL narrow beam. That can be based on best RSRP, SINR, SNR, Channel State Information (CSI), or some other measure of the signal strength or signal quality.

Action 1008. The wireless device 10 may then perform a random access procedure or initiate a random access procedure using the RACH configuration mapped to the selected RS. Thus the wireless device 10 performs a Random access based on RACH—additional RS mapping. For example, after the selection of the strongest DL beam (based on measurements of the additional RS), the wireless device 10 may initiate a random access procedure associated to the configured RACH e.g. use a RACH preamble in a time/frequency resource, for the selected RS. Thus, the provided mapping should be used during the access of a target and/or secondary cell i.e. during a handover execution or the establishment/addition of a secondary cell. For example, after the RS selection, which is equivalent to a narrow DL beam selection, the wireless device 10 may look up the previously received (e.g. in the HO command) K candidate configurations for the target's RACH and select the RACH configuration associated with or mapped to the selected CSI-RS. After the look up the wireless device 10 initiate a random access procedure with the target/secondary cell using the selected RACH configuration (i.e. the preamble and the time/frequency resources (and/or possibly code resource(s)) the preamble should be transmitted in), where the initiation of the access to the target cell consists of the wireless device 10 transmitting the configured random access preamble, which is an initial action of the random access procedure in the target cell.

Action 1009. Upon the reception of the RACH preamble in the time/frequency resource that maps to a given DL beam, the second radio network node 13 detects what is the strongest DL narrow beam covering the wireless device 10. The second radio network node 13 may then respond to the wireless device 10 with a random access response (RAR). After sending the random access preamble associated with the selected RS, the wireless device 10 may expect to receive the RAR from the target cell within a time window, which can be considered as part of the RACH configuration indicated in the handover command or RCConnectionReconfiguration with a mobilityControlInfo IE. The time window for the RAR may also be standardized, either a single one for all cases or a time window that varies depending on conditions such as numerology used for the radio interface, carrier frequency, type of cell, other parts of the RACH configuration, etc. There may also be a standardized (single or variable) default configuration for the RAR time window, which may be overridden by a configuration included in the handover command. The configuration of the physical channel associated with the RAR may also be part of the RACH configuration per RS transmitted in the HO command, enabling a cell with multiple TRPs to transmit a RAR with a different configuration depending on which TRP of the target cell the wireless device 10 should connect to. The second radio network node 13 may transmit the RAR via the narrow beam and, even before setting up the beam management procedure, start using the selected DL beam with narrow gain beamforming for data transmission on PDSCH, immediately start after the handover complete message and/or the setup of the secondary cell. Another alternative is to use a wide beam to send the RAR and only use the knowledge of the narrow beam to initiate the UP data transmission. This is an example of Action 926 in FIG. 9c.

Action 1010. The second radio network node 13 then performs user plane (UP) communication (DL or UL) with the wireless device 10 using the narrow beam associated with the RACH configuration of the random access procedure performed by the wireless device 10.

The second radio network node 13 may perform a DL beam selection for RAR and/or UP data. Upon the reception of the RACH preamble in the time/frequency resource that maps to a given DL beam, the second radio network node 13 detects what is the strongest DL narrow beam covering the wireless device 10. This is an example of Action 926 in FIG. 9c.

It should be noted that the second radio network node 13 may transmit the RAR in action 1109 via the narrow beam and, even before setting up the beam management procedure start using the select DL beam with narrow gain beamforming for data transmission on PDSCH, immediately start after the handover complete message and/or the setup of the secondary cell.

Figure 11:
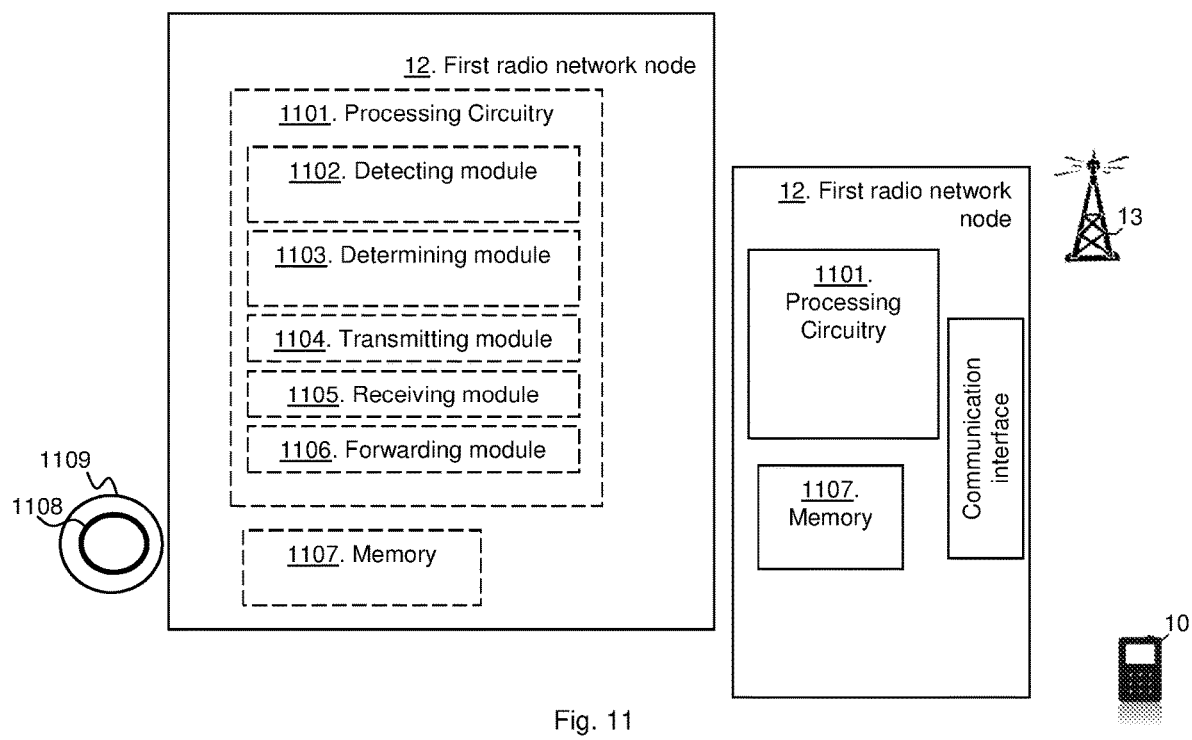
FIG. 11 is a block diagram depicting a first radio network node according to embodiments herein.

FIG. 11 is a block diagram depicting, illustrated in two embodiments, the first radio network node 12 according to embodiments herein for handling communication of the wireless device 10 in the wireless communication network 1. The first radio network node 12 is configured to serve the wireless device 10 and the wireless communication network 1 further comprises the second radio network node 13.

The first radio network node 12 may comprise processing circuitry 1101, e.g. one or more processors, configured to perform the methods herein.

The first radio network node 12 may comprise a detecting module 1102, e.g. a receiver or a transceiver. The first radio network node 12, the processing circuitry 1101, and/or the detecting module 1102 may be configured to receive the measurement from the wireless device 10, wherein the measurement indicates the signal strength or quality of the second radio network node 13 fulfilling the condition. The first radio network node 12, the processing circuitry 1101, and/or the detecting module 1102 may be configured to detect a handover of the wireless device 10 to the second radio network node 13 e.g. configured to receive a RRC measurement from the wireless device 10 indicating the signal strength or quality of the second radio network node 13 being above a threshold or a present signal strength or quality, or a triggering condition is fulfilled.

The first radio network node 12 may comprise a determining module 1103. The first radio network node 12, the processing circuitry 1101, and/or the determining module 1103 is configured to determine that the wireless device 10 is a device using a beam configuration at the first radio network node 12. The first radio network node 12, the processing circuitry 1101, and/or the determining module 1103 may be configured to determine that the wireless device 10 is a device requesting a certain QoS e.g. using a narrow beam configuration at the first radio network node 12.

The first radio network node 12 may comprise a transmitting module 1104, e.g. a transmitter or a transceiver. The first radio network node 12, the processing circuitry 1101, and/or the transmitting module 1104 is configured, when determined that the wireless device is using the beam configuration, to transmit the message, to the second radio network node 13, with the indication requesting that the wireless device 10 gets access to the second radio network node 13 and also requests the usage of a beam configuration at the second radio network node 13. E.g. the first radio network node 12, the processing circuitry 1101, and/or the transmitting module 1104 may be configured to transmit the message to the second radio network node, with the indication indicating that the wireless device 10 requests a handover and also a certain QoS or a performance of a service or a narrow beam. The indication may request usage of the beam configuration by indicating usage of a high data rate channel with beamforming of a PDSCH at the second radio network node 13 for seamless mobility. The indication may be transmitted in X2 signalling to the second radio network node 13. The indication may request usage of the beam configuration by indicating a requested quality of service or a performance of a service. The first radio network node 12, the processing circuitry 1101, and/or the transmitting module 1102 may be configured to transmit, to the second radio network node 13, data informing how the one or more sets of reference signals are associated with one or more services.

The first radio network node 12 may comprise a receiving module 1105, e.g. a receiver or a transceiver. The first radio network node 12, the processing circuitry 1101, and/or the receiving module 1105 may be configured to receive a confirmation from the second radio network node 13, which confirmation comprises a configuration indication indicating mapping of RS and RACH configuration and/or a configuration of RSs transmitted in beams at the second radio network node 13.

The first radio network node 12 may comprise a forwarding module 1106, e.g. a transmitter or a transceiver. The first radio network node 12, the processing circuitry 1101, and/or the forwarding module 1106 may be configured to forward or transmit the mapping of RSs and RACH configuration and/or RS configuration to the wireless device.

The first radio network node 12 further comprises a memory 1107. The memory comprises one or more units to be used to store data on, such as RS configurations, mappings, indications, messages, conditions, strengths or qualities, parameters, applications to perform the methods disclosed herein when being executed, and similar. The first radio network node 12 may comprise a communication interface comprising a transmitter, a receiver, a transceiver and/or one or more antennas.

The methods according to the embodiments described herein for the first radio network node 12 are respectively implemented by means of e.g. a computer program 1108 or a computer program product, comprising instructions, i.e., software code portions, which, when executed on at least one processor, cause the at least one processor to carry out the actions described herein, as performed by the first radio network node 12. The computer program 1108 may be stored on a computer-readable storage medium 1109, e.g. a disc, a universal serial bus (USB) stick, or similar. The computer-readable storage medium 1109, having stored thereon the computer program, may comprise the instructions which, when executed on at least one processor, cause the at least one processor to carry out the actions described herein, as performed by the first radio network node 12. In some embodiments, the computer-readable storage medium may be a transitory or a non-transitory computer-readable storage medium.

Figure 12:
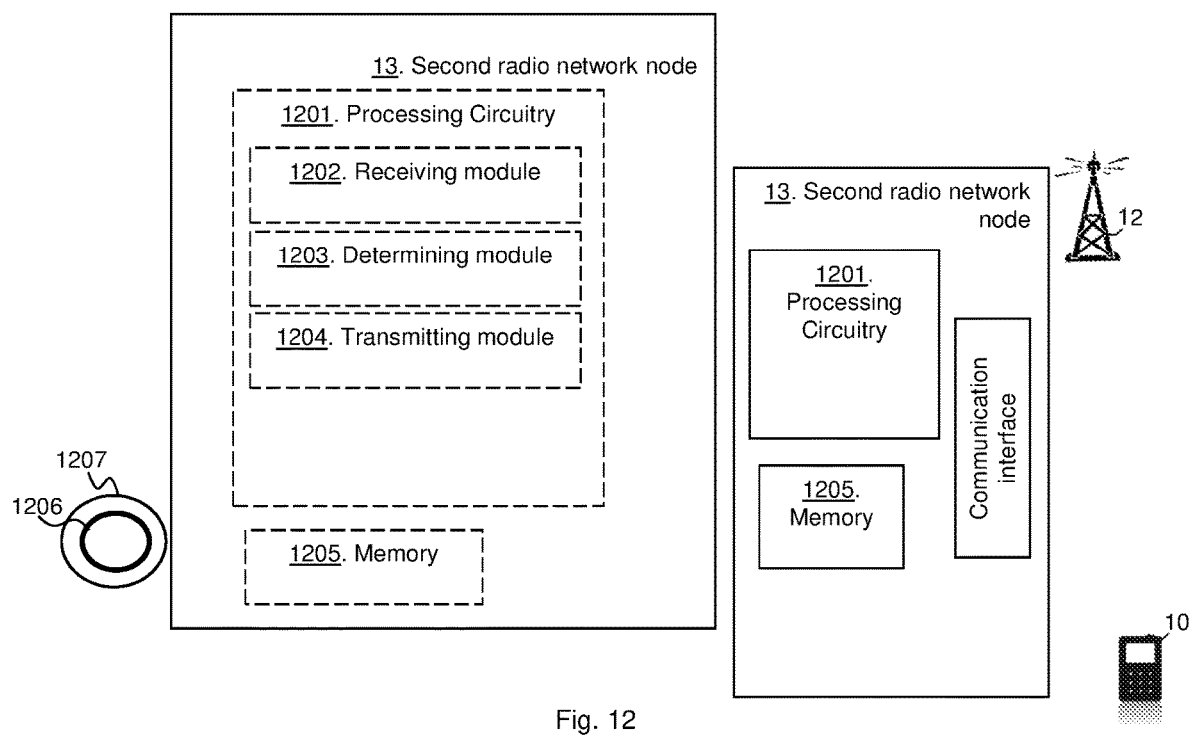
FIG. 12 is a block diagram depicting a second radio network node according to embodiments herein.

FIG. 12 is a block diagram depicting, illustrated in two embodiments, the second radio network node 13 according to embodiments herein for handling communication of the wireless device 10 in the wireless communication network 1. The wireless communication network comprises the first radio network node 12 serving the wireless device in the wireless communication network 1.

The second radio network node 13 may comprise processing circuitry 1201, e.g. one or more processors, configured to perform the methods herein.

The second radio network node 13 may comprise a receiving module 1202, e.g. a receiver or a transceiver. The second radio network node 13, the processing circuitry 1201, and/or the receiving module 1202 is configured to receive from the first radio network node 12, the message with the indication requesting that the wireless device 10 gets access to the second radio network node 13 and also requests usage of a beam configuration at the second radio network node 13. The second radio network node 13, the processing circuitry 1201, and/or the receiving module 1202 may be configured to receive, from the first radio network node 12, a message or data informing the second radio network node, e.g. with the indication indicating, that the wireless device requests a handover, and also a certain QoS or a performance of a service or a narrow beam. The indication may request usage of the beam configuration by indicating usage of a high data rate channel with beamforming of a PDSCH at the second radio network node 13 for seamless mobility. The indication may be transmitted in X2 signalling from the first radio network node 12. The indication may request usage of the beam configuration by indicating a requested quality of service or a requested performance of a service.

The second radio network node 13 may comprise a determining module 1203. The second radio network node 13, the processing circuitry 1201, and/or the determining module 1203 is configured to determine whether to admit the wireless device.

The second radio network node 13 may comprise a transmitting module 1204. The second radio network node 13, the processing circuitry 1201, and/or the transmitting module 1204 may be configured, in case the wireless device 10 is admitted, to transmit a confirmation to the first radio network node 12, which confirmation or message comprises a configuration indication indicating mapping of RSs and RACH configuration and/or a configuration of RSs transmitted in beams at the second radio network node. The second radio network node 13, the processing circuitry 1201, and/or the transmitting module 1204 may be configured to start transmission of one or more RSs of respective beam configuration.

The second radio network node 13, the processing circuitry 1201, and/or the receiving module 1202 may be configured to detect an initiated random access procedure from the wireless device 10 using at least part of a RACH configuration, which RACH configuration is mapped to a RS, such as a CSI-RS, out of the one or more RSs transmitted. The second radio network node 13, the processing circuitry 1201, the receiving module 1202 and/or the transmitting module 1204 may be configured use the beam configuration associated to the RS to perform data transmissions to or from the wireless device 10.

The second radio network node 13 further comprises a memory 1205. The memory comprises one or more units to be used to store data on, such as RS configurations, mappings, condition, strengths or qualities, parameters, applications to perform the methods disclosed herein when being executed, and similar. The second radio network node 13 may comprise a communication interface comprising a transmitter, a receiver, a transceiver and/or one or more antennas.

The methods according to the embodiments described herein for the second radio network node 13 are respectively implemented by means of e.g. a computer program 1206 or a computer program product, comprising instructions, i.e., software code portions, which, when executed on at least one processor, cause the at least one processor to carry out the actions described herein, as performed by the second radio network node 13. The computer program 1206 may be stored on a computer-readable storage medium 1207, e.g. a disc, a USB stick or similar. The computer-readable storage medium 1207, having stored thereon the computer program, may comprise the instructions which, when executed on at least one processor, cause the at least one processor to carry out the actions described herein, as performed by the second radio network node 13. In some embodiments, the computer-readable storage medium may be a transitory or a non-transitory computer-readable storage medium.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc, Operation and Maintenance (O&M), Operation Support System (OSS), Self-Organizing Network (SON), positioning node e.g. Evolved Serving Mobile Location Centre (E-SMLC), Minimizing Drive Test (MDT) node etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g. data) e.g. LTE, LTE Frequency Duplex Division/Time Duplex Division (FDD/TDD), WCDMA/HSPA, GSM/GERAN, Wi Fi, WLAN, CDMA2000 etc.

Antenna node: An "antenna node" is a unit capable of producing one or more beams covering a specific service area or direction. An antenna node can be a base station, or a part of a base station.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance tradeoffs inherent in these design choices.

It is herein disclosed a method performed by a first radio network node for handling communication of a wireless device in a wireless communication network. The first radio network node serves the wireless device and the wireless communication network further comprises a second radio network node. The first radio network node detects a handover of the wireless device to the second radio network node e.g. receiving a RRC measurement from the wireless device indicating a signal strength or quality of the second radio network node above a threshold or a present signal strength or quality or a triggering condition is fulfilled. The first radio network node may determine that the wireless device is a device requesting a certain QoS e.g. using a narrow beam configuration at the first radio network node. The first radio network node transmits a message to the second radio network node, with an indication indicating that the wireless device requests a handover and also a certain QoS or a performance of a service or a narrow beam. The first radio network node may then receive a confirmation from the second radio network node which confirmation comprises a configuration indication indicating mapping of RSs and RACH configuration and/or a configuration of RSs transmitted in beams at the second radio network node. This mapping and/or RS configuration may then be forwarded to the wireless device.

It is further herein disclosed a method performed by a second radio network node for handling communication of a wireless device in a wireless communication network. The wireless communication network comprises a first radio network node that serves the wireless device in the wireless communication network. The second radio network node receives from the first radio network node, a message with an indication indicating that the wireless device requests a handover and also a certain QoS or a performance of a service or a narrow beam. The second radio network node may then determine whether to admit the wireless device and in that case transmit a confirmation to the first radio network node which confirmation comprises a configuration indication indicating mapping of RSs and RACH configuration and/or a configuration of RSs transmitted in beams at the second radio network node.

Embodiments herein address an inter-radio network node coordination issue, focusing on inter-radio network node signaling, i.e. signaling between different radio network nodes, across the Xn interface e.g. X2 like interface. In some embodiments enhancements are disclosed to what will look like an Xn: Handover Request and the Xn: Handover Request Ack, especially in the case CSI-RS configuration is used for handover execution optimizations in e.g. NR.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a first radio network node for handling communication of a wireless device in a wireless communication network, wherein the first radio network node serves the wireless device and the wireless communication network further comprises a second radio network node, the method comprising:
   determining that the wireless device is a device using a beam configuration at the first radio network node; and
   transmitting a message when determined that the wireless device is using the beam configuration, to the second radio network node, with an indication requesting that the wireless device gets access to the second radio network node and also requests usage of a beam configuration at the second radio network node; and
   receiving a confirmation from the second radio network node in response to the message with an indication requesting that the wireless device gets access to the second radio network node, which confirmation comprises a configuration indication indicating mapping of reference signals, RS, and random access channel, RACH, configuration and/or a configuration of RSs transmitted in beams at the second radio network node.

2. The method according to claim 1, further comprising receiving a measurement from the wireless device, wherein the measurement indicates a signal strength or quality of the second radio network node fulfilling a condition, and the message is transmitted when the condition is fulfilled.

3. The method according to claim 1, wherein the indication requesting usage of the beam configuration by indicating usage of a high data rate channel with beamforming of a Physical Downlink Shared Channel, PDSCH, at the second radio network node for seamless mobility.

4. The method according to claim 1, wherein the indication requests usage of the beam configuration by indicating a requested quality of service or a performance of a service.

5. The method according to claim 1, wherein the mapping of RSs and RACH configuration, and/or RS configuration is forwarded to the wireless device after receiving the confirmation from the second radio network node.

6. The method of claim 1, wherein the determining that the wireless device is a device using a beam configuration at the first radio network node by analyzing a set of information, the set of information comprising at least one of one or more buffer status reports, pervious data rate patterns of the wireless device, a quality of service profile of the wireless device, a wireless device policy for high reliability and low latency to access a high data rate.

7. The method of claim 1, wherein receiving the confirmation further comprises receiving multiple synchronization references or virtual target cell identifications of multiple radio network nodes of the second radio network node for the wireless device to access one of the multiple radio network nodes which is not completely synchronized with the first radio network node.

8. A method performed by a second radio network node for handling communication of a wireless device in a wireless communication network, wherein the wireless communication network comprises a first radio network node serving the wireless device, the method comprising
 receiving from the first radio network node, a message with an indication requesting that the wireless device gets access to the second radio network node and also requests usage of a beam configuration at the second radio network node
 determining whether to admit the wireless device; and
 transmitting in response to the message with an indication requesting that the wireless device gets access to the second radio network node, when determined to admit the wireless device, a confirmation to the first radio network node, which confirmation comprises a configuration indication indicating mapping of reference signals, RS, and random access channel, RACH, configuration and/or a configuration of RSs transmitted in beams at the second radio network node.

9. The method according to claim 8, wherein the indication requests usage of the beam configuration by indicating usage of a high data rate channel with beamforming of a Physical Downlink Shared Channel, PDSCH, at the second radio network node for seamless mobility.

10. The method according to claim 8, wherein the indication requests usage of the beam configuration by indicating a requested quality of service or a requested performance of a service.

11. The method according to claim 8, further comprising starting transmission of one or more reference signals, RS, of respective beam configuration.

12. The method according to claim 11, further comprising detecting an initiated random access procedure from the wireless device using at least part of a random access channel, RACH, configuration, which RACH configuration is mapped to a RS out of the one or more RSs transmitted; and
 using the beam configuration associated to the RS to perform data transmissions to or from the wireless device.

13. A first radio network node for handling communication of a wireless device in a wireless communication network, wherein the first radio network node is configured to serve the wireless device, and wherein the wireless communication network further comprises a second radio network node, wherein the first radio network node is configured to:
 determine that the wireless device is a device using a beam configuration at the first radio network node; and, when determined that the wireless device is using the beam configuration, to
 transmit a message, to the second radio network node, with an indication requesting that the wireless device gets access to the second radio network node and also requests a usage of a beam configuration at the second radio network node; and
 receive a confirmation from the second radio network node in response to the message with an indication requesting that the wireless device gets access to the second radio network node, which confirmation comprises a configuration indication indicating mapping of reference signals, RS, and random access channel, RACH, configuration and/or a configuration of RSs transmitted in beams at the second radio network node.

14. The first radio network node according to claim 13, wherein the first radio network node is further configured to receive a measurement from the wireless device, wherein the measurement indicates a signal strength or quality of the second radio network node fulfilling a condition, and the first radio network node is further configured to transmit the message when the condition is fulfilled.

15. The first radio network node according to claim 13, wherein the indication requests usage of the beam configuration by indicating usage of a high data rate channel with beamforming of a Physical Downlink Shared Channel, PDSCH, at the second radio network node for seamless mobility.

16. The first radio network node according to claim 13, wherein the indication is transmitted in X2 signaling to the second radio network node.

17. The first radio network node according to claim 13, wherein the indication requests usage of the beam configuration by indicating a requested quality of service or a performance of a service.

18. The first radio network node according to claim 13, wherein the first radio network node is further configured to forward the mapping of RSs and RACH configuration, and/or RS configuration to the wireless device after receiving the confirmation from the second radio network node.

19. A second radio network node for handling communication of a wireless device in a wireless communication network, wherein the wireless communication network comprises a first radio network node serving the wireless device, wherein the second radio network node is configured to
 receive from the first radio network node, a message with an indication requesting that the wireless device gets access to the second radio network node and also requests usage of a beam configuration at the second radio network node;

determine whether to admit the wireless device; and to transmit in response to the message with an indication requesting that the wireless device gets access to the second radio network node, when determined to admit the wireless device, a confirmation to the first radio network node, which confirmation comprises a configuration indication indicating mapping of reference signals, RS, and random access channel, RACH, configuration and/or a configuration of RSs transmitted in beams at the second radio network node.

20. The second radio network node according to claim 19, wherein the indication requests usage of the beam configuration by indicating usage of a high data rate channel with beamforming of a Physical Downlink Shared Channel, PDSCH, at the second radio network node for seamless mobility.

21. The second radio network node according to claim 19, wherein the indication is transmitted in X2 signaling from the first radio network node.

22. The second radio network node according to claim 19, wherein the indication requests usage of the beam configuration by indicating a requested quality of service or a requested performance of a service.

23. The second radio network node according to claim 19, wherein the second radio network node is further configured to:
   start transmission of one or more RSs of respective beam configuration.

24. The second radio network node according to claim 23, wherein the second radio network node is further configured to:
   detect an initiated random access procedure from the wireless device using at least part of a RACH configuration, which RACH configuration is mapped to a RS out of the one or more RSs transmitted; and to
   use the beam configuration associated to the RS to perform data transmissions to or from the wireless device.

* * * * *